Figure 1:
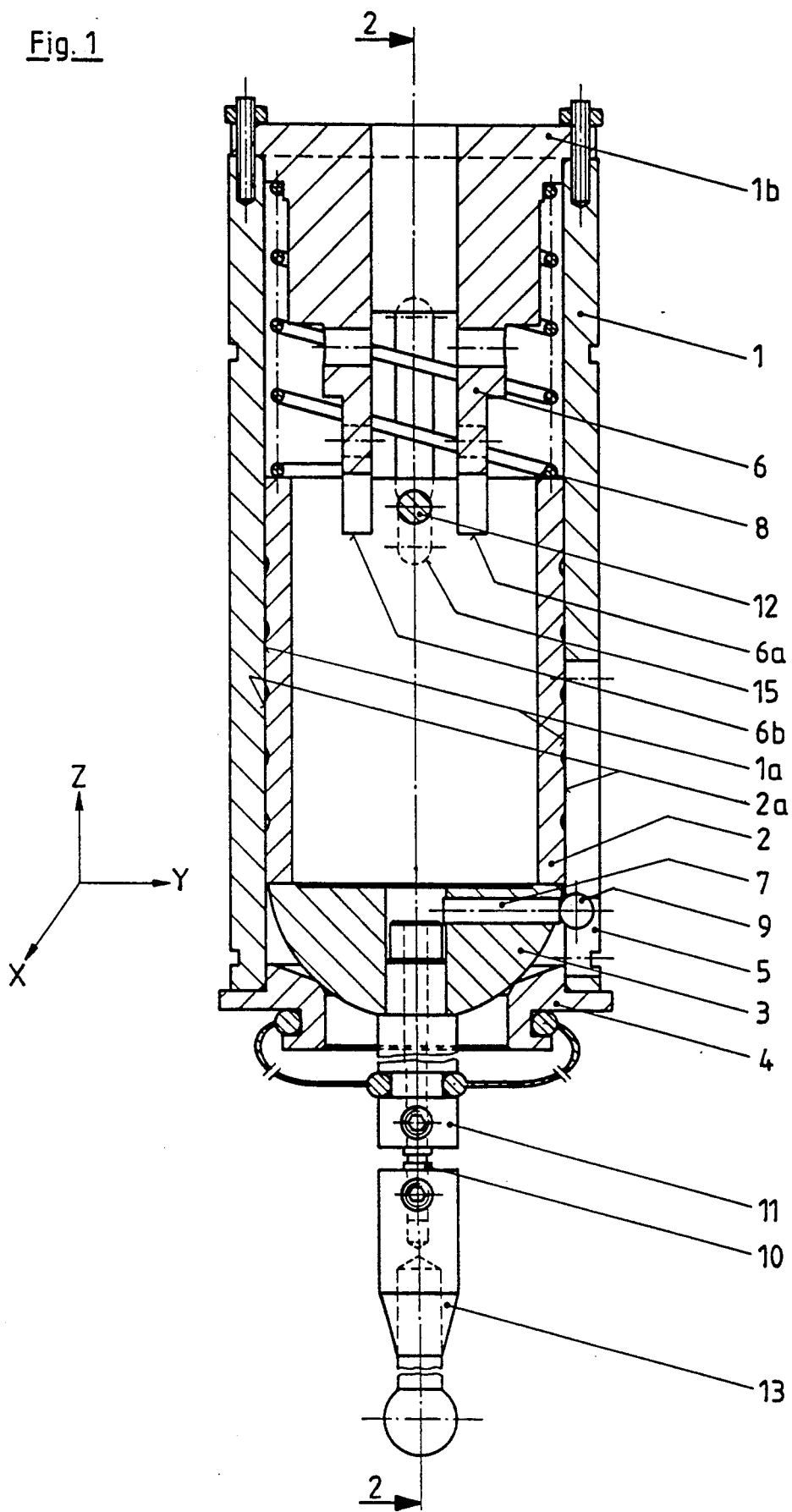

United States Patent [19]

Dubois-Dunilac et al.

[11] Patent Number: 5,321,895

[45] Date of Patent: Jun. 21, 1994

[54] CONTACT SENSING PROBE

[75] Inventors: Daniel Dubois-Dunilac, Nuvilly; Werner Salvisberg, Lyss; Jean-Daniel Fridez, Mümliswil, all of Switzerland

[73] Assignee: Saphirwerk Industrieprodukte AG, Biel, Switzerland

[21] Appl. No.: 892,031

[22] Filed: Jun. 2, 1992

[30] Foreign Application Priority Data

Jun. 7, 1991 [CH] Switzerland .......................... 1706/91

[51] Int. Cl.$^5$ .......................... G01B 5/20; G01B 7/28
[52] U.S. Cl. .......................... 33/556; 33/559; 33/DIG. 11
[58] Field of Search .................. 33/556, 558, 559, 561, 33/23.11, DIG. 11

[56] References Cited

U.S. PATENT DOCUMENTS

| | | |
|---|---|---|
| 3,250,012 | 5/1966 | Hilton et al. . |
| 3,520,063 | 7/1970 | Rethwish et al. ..................... 33/558 |
| 4,616,420 | 10/1980 | Golinelli ............................... 33/558 |
| 4,941,266 | 7/1990 | Bissegger et al. ................. 33/559 X |
| 5,136,789 | 8/1992 | Burton ................................... 33/558 |

FOREIGN PATENT DOCUMENTS

| | | |
|---|---|---|
| 0332575 | 2/1989 | European Pat. Off. . |
| 3701730 | 8/1988 | Fed. Rep. of Germany ........ 33/556 |

OTHER PUBLICATIONS

American Machinist/Metalworking MFG Jan. 21, 1963 pp. 98 & 99 "Ceramic gages and Fixtures" by Grand.

*Primary Examiner*—William A. Cuchlinski, Jr.
*Assistant Examiner*—C. W. Fulton
*Attorney, Agent, or Firm*—Shoemaker and Mattare, Ltd.

[57] ABSTRACT

A contact sensing probe with a cylindrical housing component (1), with a bearing (4) and a hemispherical element (3), possesses a stylus (13) which displaces the hemispherical element (3) and, with that, the transmission element (2). A measured value converter (14) is provided within the contact sensing probe. The running surfaces (1a, 2a) of the housing component (1) and the transmission element (2) comprise high strength ceramic material with a mean roughness value $R_a$ of $\leq 0.8$ μm, respectively 32 μin. Rotational security is provided not only for the hemispherical element (3) but also for the transmission element (2).

3 Claims, 5 Drawing Sheets

Fig_5
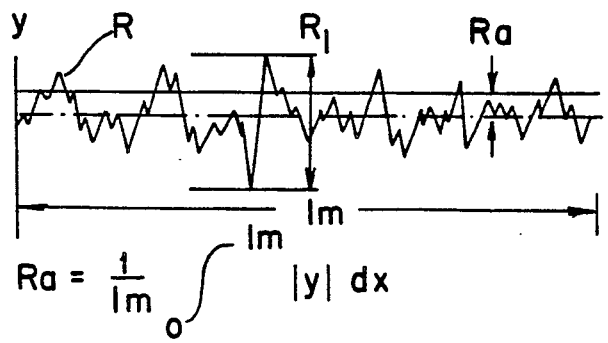
Fig_6
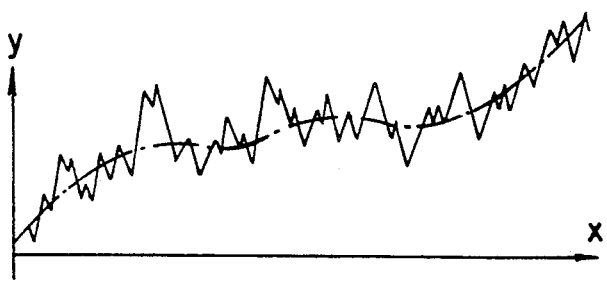
Fig_7
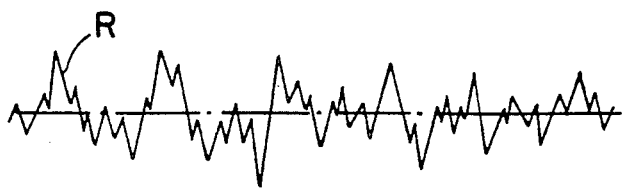

CONTACT SENSING PROBE

The invention concerns a contact sensing probe.

Contact sensing probes are used in industry for the most varied of purposes. These types of contact sensing probes have, for example, been made known in DE-A1-37 01 730, in DE-A1-36 03 269, in U.S. Pat. No. 3,250,012 or in EP-A2-332 575. Such contact sensing probes are mainly employed with multi-coordinate measuring machines and with machine tools where the work piece is able to be displaced in numerous axes in relation to the stylus. Here, the displacement travel is measured and measurement impulses are transmitted by a measured value converter during feeling of the work piece. With that, the most varied measured value converters can be employed with which, for example, merely the presence of a work piece, the position of a work piece or a travelled distance can be measured.

Evidently, the exactness of measurement and the general function of the contact sensing probe is not merely dependent on the measured value converter, but rather also on the bearing of the stylus spindle and the transmission of the value of the dislocation of the stylus spindle to the measured value converter. The greatest of demands are placed on this bearing and the transmission of the dislocation travel with regard to precision, running properties, resistance to corrosion and dimensional trueness. In particular, neither absolute measurement errors, errors arising from reversal of function, errors resulting from thermal expansion, from the dimensional tolerance of components nor friction must occur. The dislocation of the stylus spindle must also be transmitted to the measured value converter directly and without delay and it shall be ensured that the measuring system returns just as rapidly to its neutral position.

In the case of known contact sensing probes, most are equipped, with regard to the arrangement of bearing surfaces, with standard combinations of materials. This therefore means mostly the combination of "soft" and "hard" materials. Lubricant is employed in order to reduce both the risk of corrosion and frictional losses. Not only differential thermal expansion of the different components results, leading to temperature related errors, but also irregular frictional characteristics stemming from the viscosity of the lubricant, which, for example, can lead to errors arising from reversal of function or delays during dislocation.

An instrument has been made known in U.S. Pat. No. 3,250,012, with which the transmission element is mounted in a ball socket within a housing, and is pressed by spring force against the ball socket, respectively a bearing accommodating the ball socket. Here, the transmission element is formed as a piston which lies with two rings linearly on the inner wall of a cylindrical housing component. With that, obviously a standard construction with metal parts is involved, which is accordingly machined by hand, and with which, simply for these reasons, the previously described problems can occur. Apart from that, through the linear contact between the cylindrical wall of the housing and the transmission piston, not only compression of the surfaces and the risk of wear is increased, but also "pitting" of the piston due to problems with the lubricant. Dislocation of the stylus spindle and piston is, in addition, uncontrolled and unguided, which can lead to rotation of the stylus spindle during dislocation and, with that, incorrect measuring results.

The sensor according to EP-A2-332 575 is indeed improved by an arrangement to prevent rotation of the ball element. But this arrangement, too, can be further improved with regard to its running properties and the distribution of forces within the rotational security and the transmission element.

The invention fulfils the purpose of avoiding the known disadvantages, in particular therefore of creating a contact sensing probe which, with a simple construction, operates reliably and free of wear, and in particular functions to a great extent with zero tolerances in normal operation and under conditions of fluctuating environmental influence.

This purpose is mainly fulfilled in accordance with the characteristics of the patent claims.

Through the use of ceramic materials it is ensured, according to the invention, that primarily the same material can be used not only for the running surface of the housing component but also for the running surface of the transmission element. Accordingly, the possibility arises of selecting materials with the same coefficient of thermal expansion, through which measuring errors are avoided because each thermal expansion of the housing component, which could itself lead to an enlargement of the distance between the transmission element and the measured value converter, is accompanied by the same or a similar change in length to the transmission element, which will shorten the distance to the measured value converter, thus compensating for temperature related errors. At the same time, the use of certain high strength ceramic materials ensures excellent heat conductivity away through the wall of the cylindrical housing component onto the transmission element lying within, so that temperature fluctuations will take effect on both parts to an equal extent.

It is of advantage if the transmission element is a cylindrical body which thus rests surface to surface and not with linear contact on the inner wall of the housing component. Through this, the heat conductivity is optimalised with the effect of the previously described compensation of temperature related errors. At the same time, wear is reduced through a reduction in surface compression between cylindrical housing component and transmission element, the coefficient of friction being able to be reduced to between 0.1 and 0.3 without lubrication (in air) for relative speeds of movement of <0.5 m/s, according to the invention, by a roughness grade between N6 and N 3, preferably approximately N 4.

A particularly suitable ceramic is high strength (rigidity>250 MPa) Aluminium Oxide ceramic (Al$_2$O$_3$). The high modulus of elasticity of this ceramic material at the same time guarantees additional high rigidity.

Under the term "Roughness Grade" are understood to be the roughness grades according to those working standards listed at the end of the description. Accordingly, the mean roughness value R$_a$ amounts to 0.8 $\mu$m or 32 $\mu$in with a roughness grade of N6, or 4 $\mu$in with a roughness grade of N3. The mean roughness value R$_a$ is at the same time defined according to DIN 4768 and the roughness profile R represents all profile deviations from the mean line. The terms correspond, with that, to ISO Standard 1302-1974 and the VSM Work Standards 10231.

Primarily, resistance to wear, freedom from maintenance and temperature stability of the contact sensing probe according to the invention will be further improved if the hemispherical element and the bearing comprise a high strength ceramic material.

According to the invention, the arrangement of the measured value converter at least partly within the transmission element is additionally made possible through the formation of a cylindrical transmission element, by which means the stability and compactness of the arrangement is improved.

At the same time it is of particular advantage if the measured value converter is arranged on a support which is likewise made of a high strength ceramic material. In this way the stability of the arrangement with regard to temperature fluctuations can be further improved.

If the cylindrical housing component and/or the transmission element and/or the support for the measured value converter comprise different ceramic materials, the invention can be realised with advantage when the coefficients of thermal expansion of at least two of the materials do not deviate from one another by more than a 10%.

With certain applications, the invention can be realised if solely the running surface of the cylindrical housing component and/or solely the running surface of the transmission element comprise a ceramic material, additional supporting housing parts being provided, however. But it is of particular advantage if not only the housing component but also the transmission element are made in one piece from a ceramic material. Optimal dimensional stability and avoidance of errors during reversal of function, with simultaneously good heat conductivity from the housing component to the transmission element, is then according to the invention further improved mainly if the play between the running surface of the housing component and the running surface of the transmission element is $<2$ μm.

With that, the resistance to wear and low friction between the transmission element and the running surface of the outer housing component is further improved, according to the invention, if the roundness of both the running surfaces is $<0.5$ μm and the cylindricality is $<1$ μm and if a diametrical precision of $\pm 0.5$ μm is maintained.

Errors arising from rotation of the dislocated hemispherical element and irregular transmission of forces onto the transmission element can be avoided in an optimally simple way if not only the hemispherical element but also the transmission element is provided with a rotational securing device.

It is of particular importance with regard to the invention—also independently from the combination of features of previous patent claims—if, in the case of a contact sensing probe with hemispherical element, a spigot is provided as a rotational securing device which carries a ball which runs in a longitudinal groove which is coordinated with the outer housing component and/or the bearing of the hemispherical element. The groove is in this case a precision groove in which a hard metal or ceramic ball runs with the greatest precision.

In this way, and as opposed to the known state of the art, it is ensured in an optimally simple way that absolutely no jamming of the two guide elements can occur since the ball within the groove has at the most two points of contact. At the same time it is advantageous if the play between the ball and the groove is $<0.5$ μm and if ball and groove are fabricated from materials possessing the same coefficient of thermal expansion (or similar coefficients of thermal expansion). In this way the greatest guide accuracy will be ensured through avoidance of the risk of jamming as a result thermal expansion. This can be achieved mainly through the ball being a precision ceramic component with a roundness of $\leq 0.13$ μm, a diametric precision of $\pm 0.25$ μm and a roughness grade of approximately $\leq N\ 0$ or a roughness value $R_a$ of $\leq 0.0125$ μm, respectively 0.5 μin.

Generally, the invention creates an exact contact sensing probe in an optimally simple way and with an economical number of components which is largely independent from and not liable to interference, and is free of wear.

Figure 2:
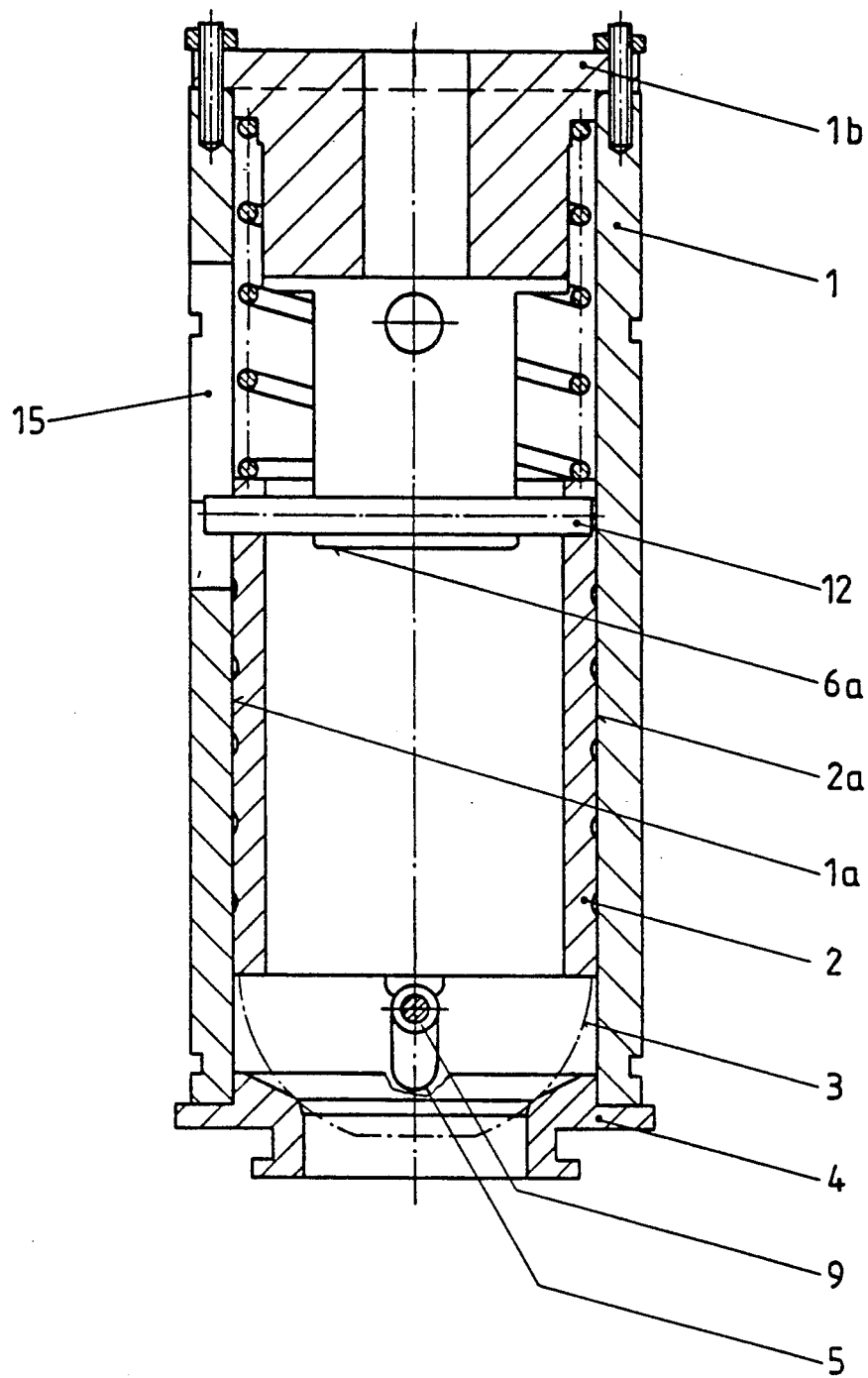
Figure 3:
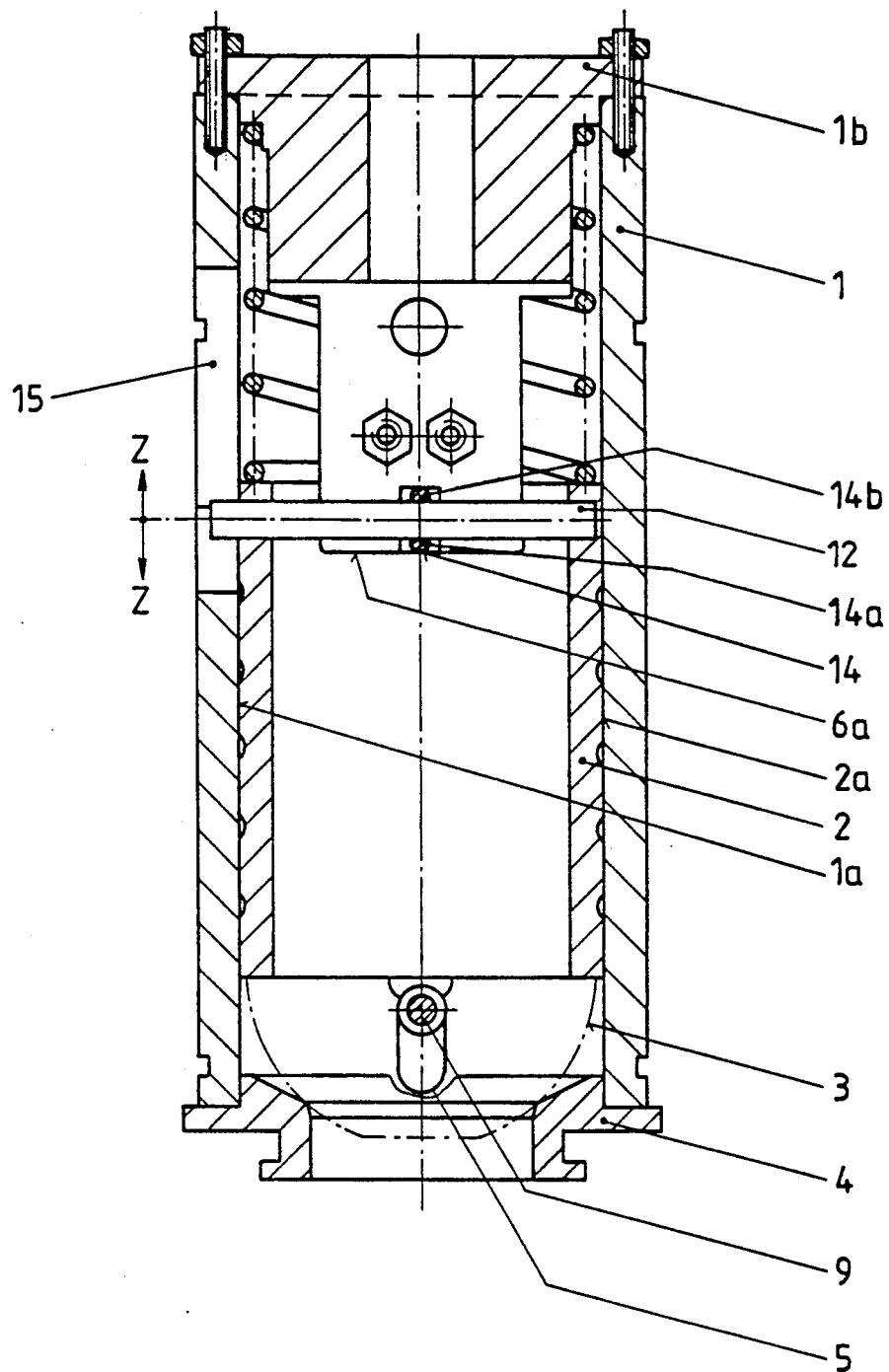
Figure 4:
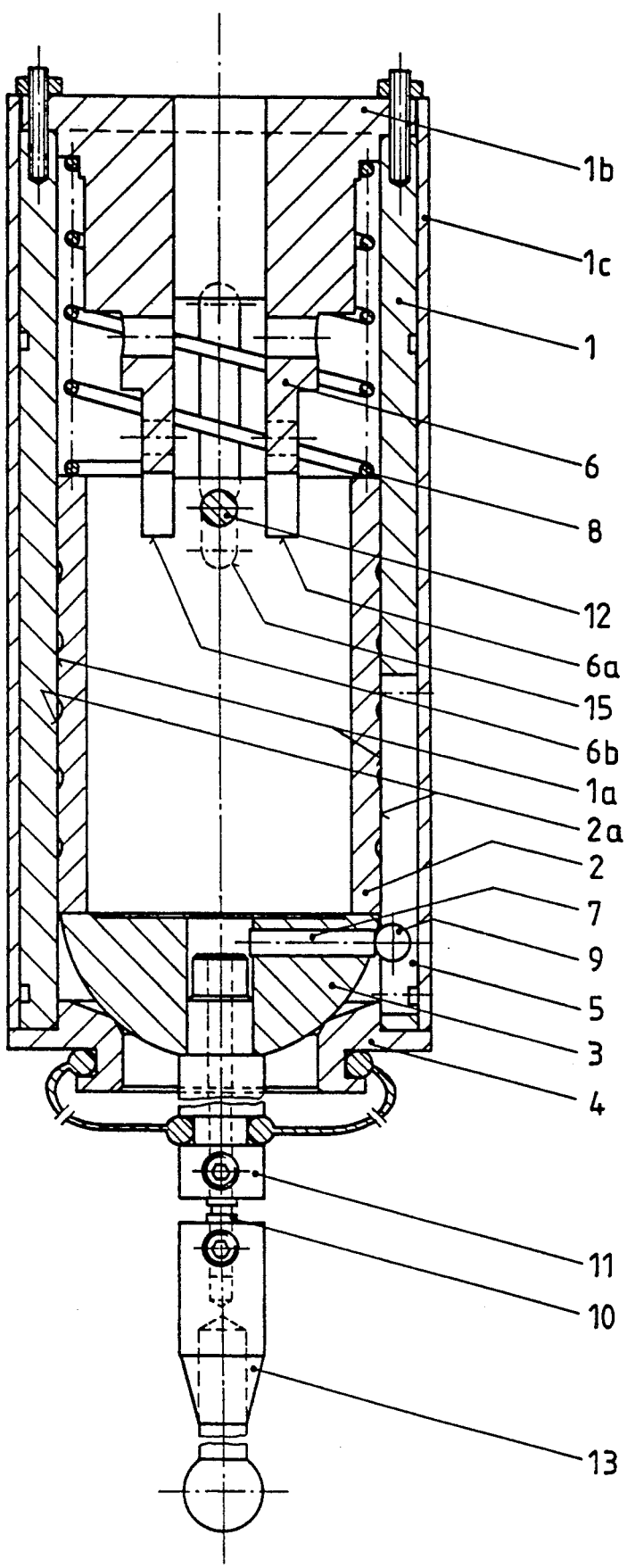

Examples of embodiments of the invention are more closely described in the following, illustrated by the drawings. Namely:

FIG. 1 a schematic representation of a contact sensing probe according to the invention, in section;

FIG. 2 a schematic representation of a section along the line A—A in FIG. 1, but with a reduced scale and without the stylus;

FIG. 3 a schematic representation of the contact sensing probe according to FIG. 2 with measured value converter incorporated;

FIG. 4 a schematic sectional representation of a contact sensing probe according to FIG. 1, with outer housing component; and FIGS. 5-7 are graphs depicting surface roughness of a test sample.

The contact sensing probes represented in FIGS. 1 to 4 possess a cylindrical outer housing component 1 which is fabricated from Aluminium Oxide ceramic. A cylindrical transmission element 2 is mounted to be able to displace longitudinally in the housing component 1. The transmission element 2 is likewise fabricated from a ceramic material ($Al_2O_3$—ceramic with a rigidity of $>250$ MPa and a (coefficient of thermal expansion of $<10 \times 10^{-6}\ K^{-1}$ in accordance with the material used for the housing component 1).

The running surfaces 1a, 2a of the housing component 1, respectively the transmission element 2, are ground and possess a roughness grade of N4, this means a mean value $R_a$ (according to DIN 7768) of approximately 0.2 μm to repectively 8 μin. The play between the running surfaces 1a and 2a amounts to between approximately 1 and 1.5 μm. Both the running surfaces make contact with one another almost without play, and can nevertheless slide in contact with each other without lubricant and practically without wear on the basis of the high surface quality. Each warming of the housing component 1 will lead, on the basis of the surface contact between the running surfaces 1a and 2a, to a practically simultaneous warming of the transmission element 2.

The transmission element 2 is pressed by a spring 8 against a hemispherical element 3 which is mounted to rotate in a bearing 4 in the X- and Y- axis. The hemispherical element 3 and the bearing 4 are fabricated from the same ceramic material as the housing component 1 and the transmission element 2, and the surface finish and the roughness grade are also similar. A stylus 13 is attached to the hemispherical element 3 by means of a stylus holder 11 and a break-off pin 10. As soon as the stylus 13 is subjected to a sideways force, the hemispherical element 3 will rotate in a known way within the bearing 4, through which the transmission element 2 is lifted against the force of the spring. In so far as the stylus 13 is subjected to a vertical axial force from below, the hemispherical element 3 can be lifted out of the bearing 4, by which means the transmission element 2 is likewise displaced axially upwards against the force of the spring 8.

In order to avoid the hemispherical element 3 rotating around its own axis during dislocation, rotational security in the form of a spigot 7 is provided, this spigot carrying a ball 9 which is guided within a longitudinal groove 5 in the wall of the housing component 1. The ball 9 is a ceramic ball with a roughness grade of <N 0, this means <approximately 0.0125 $\mu$m, respectively 0.5 $\mu$in, mean roughness value $R_a$. The roundness of the ball 9 is <0.13 $\mu$m and the diametric precision amounts to ±0.25 $\mu$m. The play between the ball 9 and the longitudinal groove 5 is <0.5 $\mu$m, so that an absolutely precise lateral guide for the ball 9 on at the most two points of contact is ensured. A spigot 12, whose length is greater than the outer diameter of the transmission element 2, is fixed laterally in the transmission element 2. The protruding end of the spigot 12 is guided in a groove 15 provided in the running surface 1a of the housing component 1. The longitudinal travel of the transmission element 2 is thus guided by the spigot 12, which slides within the groove 15. Thus the transmission element 2 is also secured against axial rotation. The roughness grade of the spigot 12 and the groove 15 is <N 6, this means therefore <0.8 $\mu$m, respectively 32 $\mu$in $R_a$, through which sliding without friction and with reduced play is ensured.

The housing component 1 is closed off at its upper end with a disk cover 1b made from a ceramic material. A support 6 is provided in the disk cover 1b which flanks the spigot 12 at its sides with two limbs 6a, 6b and extends down into the inside space of the transmission element 2. The support 6 is consequently connected immoveably to the housing component 1, so that each axial displacement of the bearing of the transmission element as a result of the dislocation of the stylus 13 will lead to a change of the relative position between the spigot 12 and support 6. Accordingly, the support 6 is particularly suitable for the attachment of a measured value converter 14, as is suggested schematically in FIG. 3 by two light barrier sensors 14a, 14b. Each change to the position of the spigot 12 along the z-axis will in this way enable detection by one of the arrangements of light barriers 14a or 14b, the dislocation travel of the stylus 13, respectively the axial dislocation of the transmission element 2, being converted to an electrical signal which can be further processed in a known way.

Naturally, in place of the arrangement of light barriers 14a, 14b, also other known measured value converters can be provided. In particular longitudinal measuring devices, such as incremental longitudinal measuring systems according to EP-A-237 470 or inductive or capacitive measuring systems can be employed, without at the same time the framework of the invention being exceeded. With that, the relative movement of spigot 12 and support 6 is exploited in a known way in order to ascertain and convert the measured value.

In order to eradicate temperature related errors as far as possible, the cover disk 1b, the support 6, the housing component 1 and the bearing 4, in the area of its contact surface, are likewise smoothly ground and possess, at least in the area of contact, a mean roughness value $R_a$ of ≦0.8 $\mu$m, respectively 32 $\mu$in. When joining the components, these are first of all pressed upon one another at their contact surfaces so that contact of the material surfaces occurs. Then a low viscosity epoxy adhesive is applied to the gap, which is taken up through the capillary effect. Joining of the components in this way will prevent longitudinal changes to the components resulting from the greater thermal expansion of the adhesive, since the ceramic components make direct contact on the highest points on their surfaces.

With the examples of embodiments according to FIGS. 1 to 3, the housing component 1 is not only anticipated as a housing jacket for the contact sensing probe 2 but also as an accommodation cylinder for the transmission element 2. With the embodiment according to FIG. 4, the housing component 1 is surrounded by an additional housing jacket 1c. The housing jacket 1c is connected to the housing component 1 by a tension ring, which is not shown here, in such a way that relative movement, arising through thermal expansion on the basis of differing coefficients of thermal expansion between the two components, is possible. It would, for example, in the same way naturally also be possible to provide an additional inner jacket within the transmission element 2, for example for strengthening of the component, without exceeding the framework of the invention.

In the case of the embodiment according to FIG. 4, the bearing 4 is, apart from that, extended upwards at its sides into the housing component 1, so that the longitudinal groove 5 can be arranged in the bearing 4 and not, as shown in FIGS. 1 to 3, in the wall of the housing 1. Since the bearing 4 is fixed firmly to the housing component 1, the same effect of rotational security, as is described in connection with FIGS. 1 to 3, is achieved in this way.

Extract from work standards HN10 (≈VSM 1231)

The main criterium, the arithmetical mean roughness value $R_a$, can be established by means of the following table. Errors in interpretation caused by the use of both units (micrometers and micro inches) are excluded through the use of Roughness Grades.

| Roughness grades | Roughness values $R_a$ | |
|---|---|---|
| | $\mu$m | $\mu$in |
| N 12 | 50 | 2000 |
| N 11 | 25 | 1000 |
| N 10 | 12.5 | 500 |
| N 9 | 6.3 | 250 |
| N 8 | 3.2 | 125 |
| N 7 | 1.6 | 63 |
| N 6 | 0.8 | 32 |
| N 5 | 0.4 | 16 |
| N 4 | 0.2 | 8 |
| N 3 | 0.1 | 4 |
| N 2 | 0.05 | 2 |
| N 1 | 0.025 | 1 |
| N 0 | 0.0125 | |

Definition of Mean Roughness Value $R_a$ (DIN 4768)

Mean Roughness Value $R_a$ DIN 4768 is the arithmetical mean value of all amounts of the roughness profile R within the total measured distance $l_m$ as depicted in FIG. 5.

Reference Line: Mean Line

The mean line represents waviness and shape. It intercepts the sensed profile in such a way that the surfaces of the raised section of the profile compensate the surfaces of the deep sections of the profile. See FIG. 6.

The mean line is produced by RC filtering or M filtering. Perthometer S6P shows initially the run of the mean line in the sensed profile. All calculations stemming from the mean line are characterized with "R". For example: R.Profile, $R_a$, $R_q$, $R_z$, $R_p$.

Roughness profile R

Represents all deviations of the profile from the mean line.
See FIG. 7.

Inasmuch as the invention is subject to modifications and variations, the foregoing description and accompanying drawings should not be regarded as limiting the invention, which is defined by the following claims and various combinations thereof.

We claim:
1. A contact sensing probe comprising
a housing including a cylindrical component (1) and a bearing (4) attached to the housing,
a hemispherical element (3) retained at one end of the housing by said bearing,
a stylus (13) extending from the hemispherical element, said stylus being movable in at least one plane relative to the housing,
a transmission element (2) longitudinally moveable relative to the housing by said hemispherical element upon dislocation of said stylus,
said cylindrical component having an inner cylindrical sliding surface (1a), and
a support (6) for a displacement transducer (14),
said transmission element having an outer cylindrical sliding surface (2a) in intimate sliding contact with the inner surface of the cylindrical component,
the respective sliding surfaces of the cylindrical component, the transmission element, and the support each consisting essentially of a high strength ceramic material,
means for preventing rotation of the hemispherical element relative to the housing component,
wherein said rotation preventing means comprises a guide pin (7) on the hemispherical element, and said housing has a longitudinal groove (5) which receives said guide pin,
wherein said guide pin comprises a ball (9) received in said longitudinal groove.
2. The probe of claim 1, wherein said ball is a precision ceramic component having an ISO roughness grade of less than N0, a roundness less than 0.13 μm, and diametric precision of ±0.25 μm.
3. The probe of claim 2, wherein the ball has a clearance relative to the groove of less than 0.5 μm.

* * * * *